US006600609B2

(12) United States Patent
Yamakawa

(10) Patent No.: US 6,600,609 B2
(45) Date of Patent: Jul. 29, 2003

(54) INNER-FOCUS-TYPE LENS

(75) Inventor: Hiromitsu Yamakawa, Saitama (JP)

(73) Assignee: Fuji Photo Film Optical Co., Ltd., Saitama (JP)

( * ) Notice: Subject to any disclaimer, the term of this patent is extended or adjusted under 35 U.S.C. 154(b) by 43 days.

(21) Appl. No.: 09/950,670

(22) Filed: Sep. 13, 2001

(65) Prior Publication Data

US 2002/0075570 A1 Jun. 20, 2002

(30) Foreign Application Priority Data

Sep. 27, 2000 (JP) ........................ 2000-293710

(51) Int. Cl.⁷ ................................ G02B 9/00
(52) U.S. Cl. ........................ 359/754; 359/785
(58) Field of Search ................... 359/557, 676, 359/680, 682–689, 691, 699, 745, 754, 755, 756, 763, 771, 784, 785

(56) References Cited

U.S. PATENT DOCUMENTS

| 4,534,626 A | | 8/1985 | Mihara | 359/745 |
| 5,589,986 A | * | 12/1996 | Shibata | 359/684 |
| 5,646,779 A | * | 7/1997 | Sato | 359/557 |
| 6,115,188 A | * | 9/2000 | Nishio et al. | 359/690 |

* cited by examiner

*Primary Examiner*—Jordan M. Schwartz
*Assistant Examiner*—Jessica Stultz
(74) *Attorney, Agent, or Firm*—Arnold International; Bruce Y. Arnold

(57) ABSTRACT

A lens having a long focal length that is suitable for photography with a large film size is disclosed having three lens groups of positive, negative, and positive refractive power, in order from the object side, as follows: a first lens group having a positive refractive power and formed of, in order from the object side, one or two positive lens element (s), a negative lens element, and a positive lens element; a second lens group having a negative refractive power and formed of, in order from the object side, a negative lens element and a positive lens element; and a third lens group having a positive refractive power and formed of, in order from the object side, a positive lens element, a negative lens element, and a positive lens element. Focusing is performed by moving the second lens group as one unit along the optical axis. The various aberrations of the lens are very favorably corrected by satisfying specified design criteria of the lens element configuration and specified Conditions, so as to provide a compact lens having 8 or 9 lens elements.

31 Claims, 10 Drawing Sheets

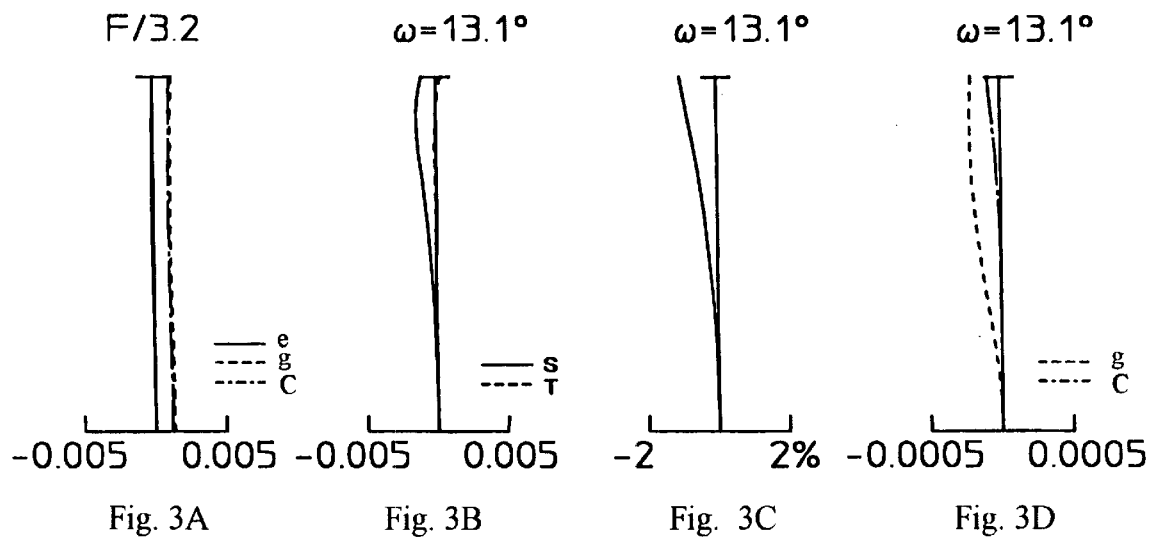
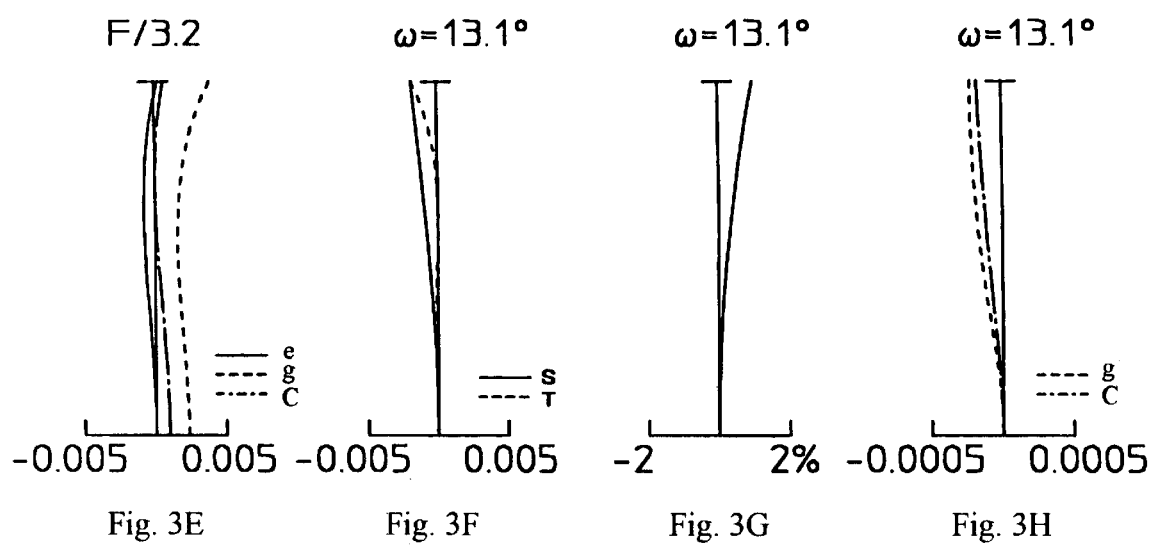

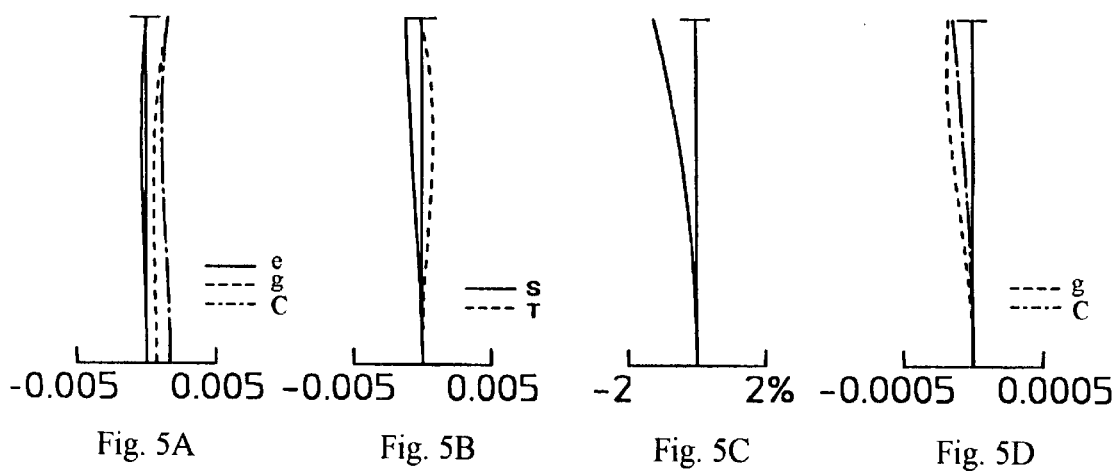
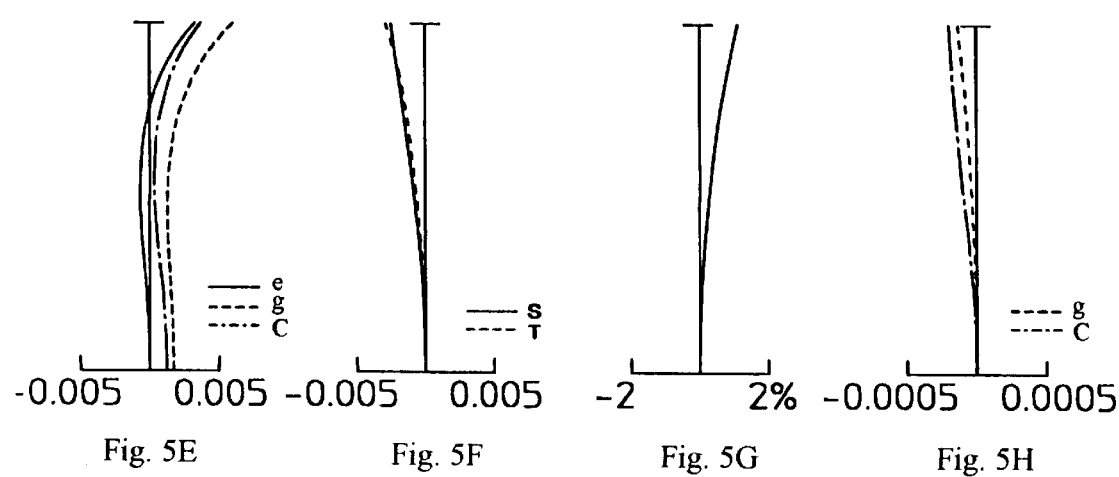

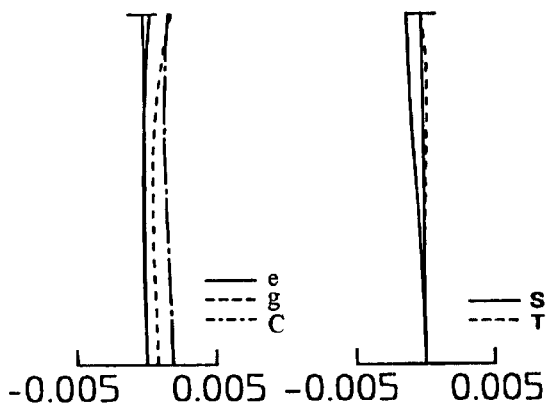
Fig. 6A  Fig. 6B  Fig. 6C  Fig. 6D
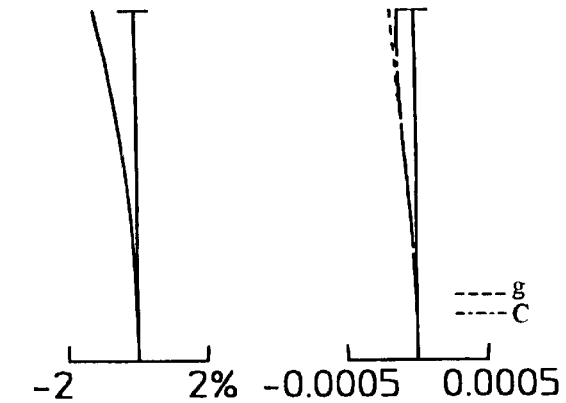
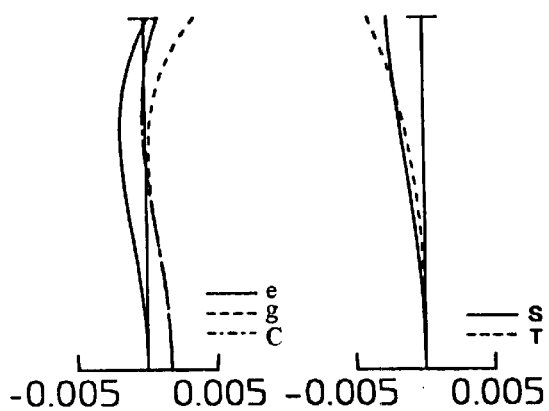
Fig. 6E  Fig. 6F  Fig. 6G  Fig. 6H
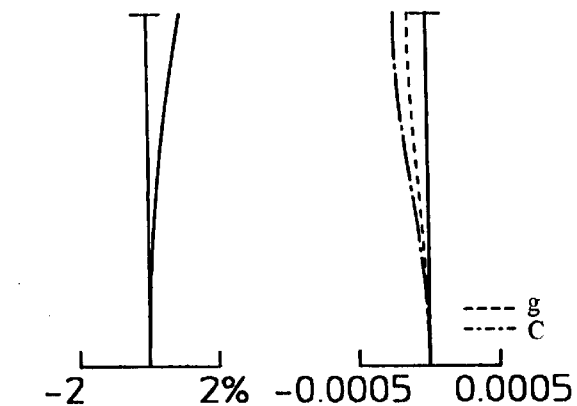

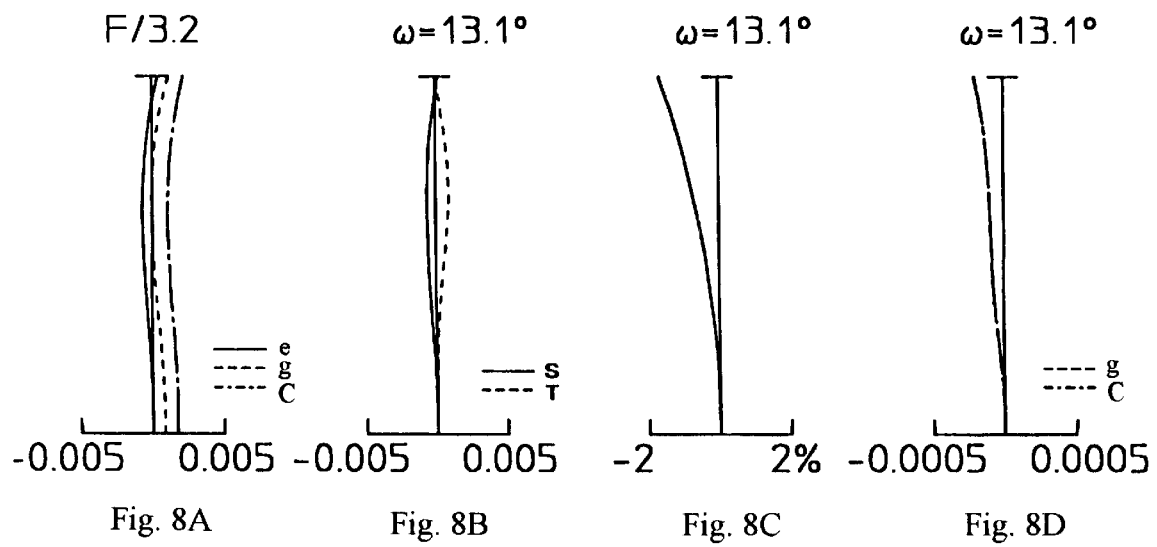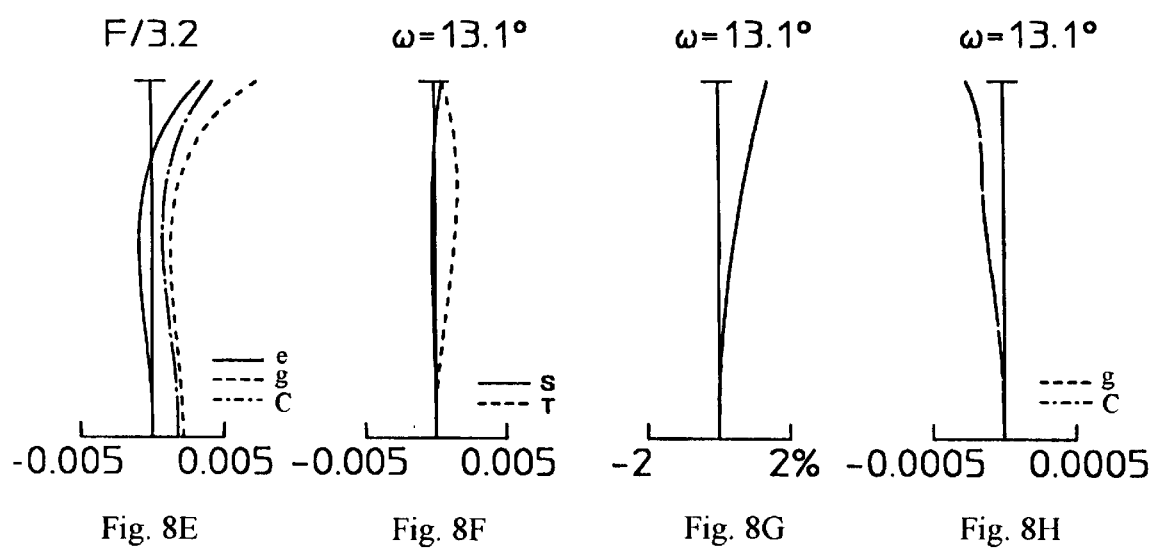

INNER-FOCUS-TYPE LENS

BACKGROUND OF THE INVENTION

In a photographic lens, focusing is generally performed by moving, relative to the film plane, the entire photographic lens or moving a part of the photographic lens. It is mechanically difficult to rapidly focus cameras having a large film size by moving the entire photographic lens because the entire photographic lens is large and heavy. Therefore, an inner-focus type construction is provided wherein the focus adjustment is performed by moving internal, relatively light, lens elements instead of moving the entire photographic lens.

Although the inner-focus type construction is well known in the field of imaging lenses for single-lens reflex cameras and video cameras, such a construction is rare in the case of cameras with a large film size because of the difficulty in favorably correcting aberrations in such cameras. Lens aberrations become more troublesome in proportion to the film size. Thus, even if the aberration amount is small enough not to be a problem for a lens with a short focal length (i.e., for a lens of a small-size film camera), blurring at the image surface is proportional to the focal length of the lens for a given amount of aberration, and thus may become readily noticeable for a lens with as large a focal length as is required by cameras having a large film size.

BRIEF SUMMARY OF THE INVENTION

The present invention relates to an inner-focus type lens for use in photographic cameras, especially for such a lens having a long focal length so as to be suitable for use in cameras having a large film size. The object of the present invention is to provide a compact, inner-focus type lens having aberrations that are favorably corrected to such an extent so as to enable the photographic lens to be used in a camera having a large film size.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 3A–3H are aberration curves for Embodiment 1;

FIGS. 5A–5H are aberration curves for Embodiment 3;

FIGS. 6A–6H are aberration curves for Embodiment 4;

FIGS. 7A–7H are aberration curves for Embodiment 5;

FIGS. 8A–8H are aberration curves for Embodiment 6;

DETAILED DESCRIPTION

Figure 1:
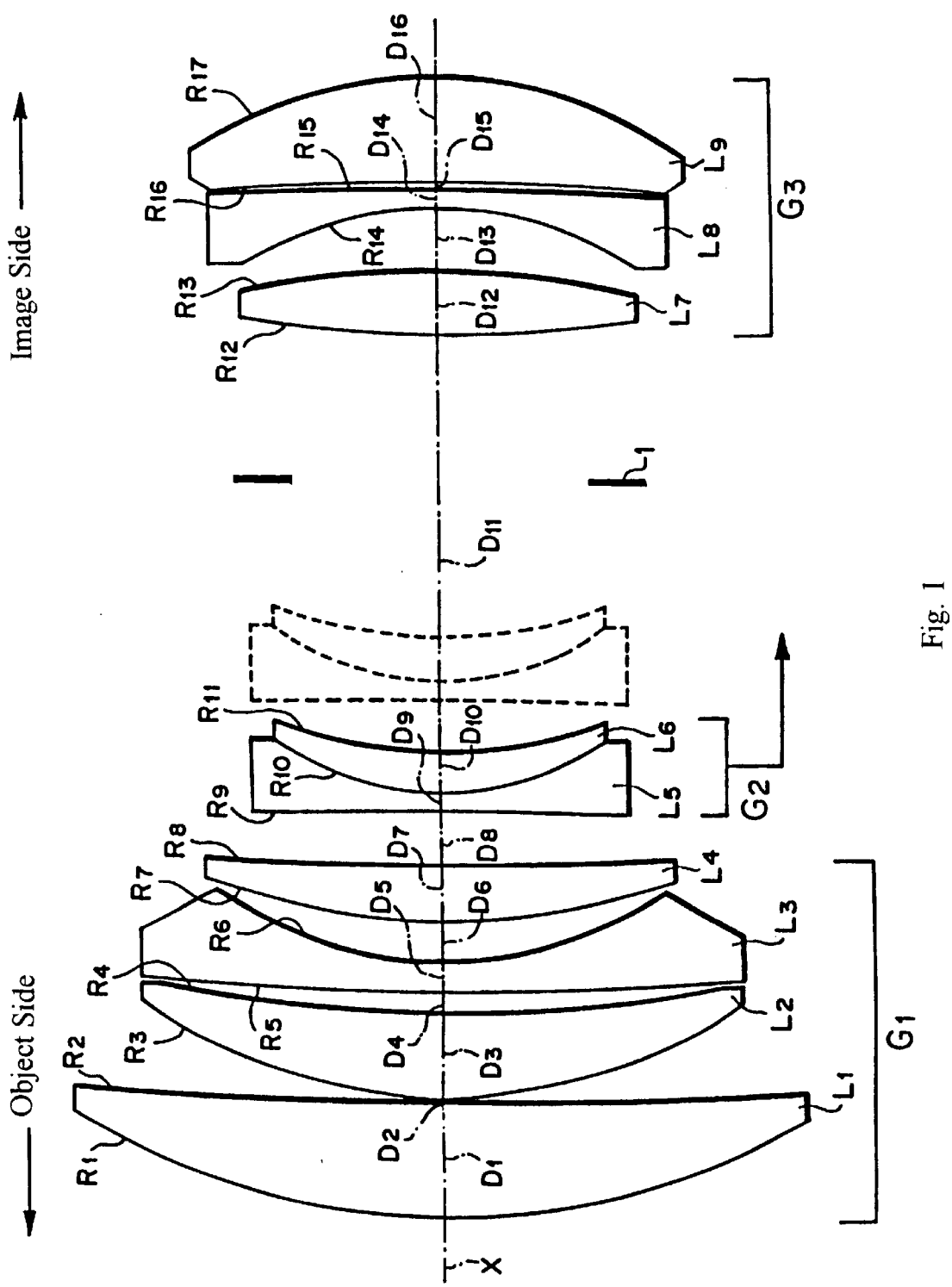
FIG. 1 shows the lens element configuration of Embodiment 1 of the present invention.

The inner-focus type lens of this invention is formed of, in order from the object side, a first lens group having positive refractive power, a second lens group having negative refractive power, and a third lens group having positive refractive power. The first lens group is formed of, in sequential order from the object side, one or two lens elements of positive refractive power, a lens element of negative refractive power, and a lens element of positive refractive power. The second lens group is formed of, in sequential order from the object side, a negative lens element and a positive lens element that are cemented together. The third lens group is formed of, in sequential order from the object side, a positive lens element, a negative lens element, and a positive lens element. Focusing is performed by moving the second lens group as a unit along the optical axis, while satisfying the following Conditions (1)–(3):

$0.58 < f_1/f < 0.84$      Condition (1)

$-0.58 < f_2/f < -0.4$      Condition (2)

$0.54 < f_3/f < 1.2$      Condition (3)

where f is the focal length of the inner-focus type lens when focused on an object at infinity, $f_1$ is the focal length of the first lens group, $f_2$ is the focal length of the second lens group, and $f_3$ is the focal length of the third lens group.

It is preferable that the inner-focus type lens also satisfy the following Conditions (4) and (5):

$0.5 < f_{1I}/f < 1.2$      Condition (4)

$-0.6 < f_{1N}/f < -0.3$      Condition (5)

where f is the focal length of the inner-focus type lens when focused on an object at infinity, $f_{1I}$ is the focal length of the most object-side lens element in the first lens group, and $f_{1N}$ is the focal length of the negative lens element in the first lens group (in air, if cemented).

The first lens group is preferably formed of, in sequential order from the object side, a first lens element $L_1$ of positive refractive power having a meniscus shape with its convex surface on the object side, a second lens element $L_2$ of positive refractive power having a meniscus shape with its convex surface on the object side, a third lens element $L_3$ of negative refractive power having a meniscus shape with its convex surface on the object side, and a fourth lens element $L_4$ of positive refractive power having a meniscus shape with its convex surface on the object side. The second lens element $L_2$ and the third lens element $L_3$ may be cemented together.

Furthermore, it is desirable that the lens elements $L_2$ and $L_4$ of the first lens group are made of a material that satisfies the following Condition (6):

$N_e + 0.015\, v_d > 2.58$      Condition (6)

where $N_e$ is the index of refraction of the lens material at wavelength 546.1 nm, $v_d$ is the Abbe number of the lens material at wavelength 587.6 nm.

The second lens group may be formed of, in order from the object side, either a biconcave lens element that is joined to a positive meniscus lens element, or a negative meniscus lens element with its concave surface on the image side that is joined to a positive meniscus lens element.

The third lens group is formed of, in sequential order from the object side, a lens element that is biconvex, a lens element of negative refractive power having a meniscus shape with its convex surface on the image side, and a lens element of positive refractive power having a meniscus shape with its convex surface on the image side. Furthermore, it is desirable that the negative lens element in the third lens group having a meniscus shape with its convex surface on the image side is made of an optical material that satisfies the following Condition (7):

$$\theta_{gF} + 0.0019\, \upsilon_d < 0.650 \qquad \text{Condition (7)}$$

where $\theta_{gF}$ is the partial dispersion ratio of the optical material, defined by $$\theta_{gF} = (N_g - N_F)/(N_F - N_C),$$

$\upsilon_d$ is the Abbe number of the optical material defined by $\upsilon_d = (N_d - 1)/(N_F - N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

The invention will first be explained in general terms with reference to FIG. 1. The first lens group $G_1$ has positive refractive power and is fixed in position, the second lens group $G_2$ has negative refractive power and moves along the optical axis as a unit when focusing, as illustrated by the dotted lines. The third lens group $G_3$ has positive refractive power and is fixed in position. The first lens group $G_1$ is formed of, in sequential order from the object side, two positive lens elements $L_1$ and $L_2$, a negative lens element $L_3$, and a positive lens element $L_4$. The second lens group $G_2$ is formed of, in sequential order from the object side, a negative lens element $L_5$ and a positive lens element $L_6$. The third lens group $G_3$ is formed of, in sequential order from the object side, a positive lens element $L_7$, a negative lens element $L_8$, and a positive lens element $L_9$. A diaphragm 1 is installed between the second lens group $G_2$ and the third lens group $G_3$, and light flux from the object is converged onto an image surface (not shown) by this inner-focus type lens. The optical axis is indicated by X in the figure.

When focusing, the fifth lens element $L_5$ and the sixth lens element $L_6$, both of which form the second lens group $G_2$, move as one body. In this way, because it is an inner-focus type lens, focusing is made simple by the limited number of lens elements that are moved. By moving only these small and light-weight lens elements during focusing, the moving mechanism can be miniaturized. Therefore, the driving force necessary to focus the lens is reduced, enabling a cost reduction and rapid focusing. Also, by moving a plural number of lens elements as a single unit, focusing can be performed by one driving mechanism. This eliminates the necessity of installing a moving mechanism for each lens element individually, thereby making the lens mechanically simple.

According to the inner-focus type lens of the present invention, in addition to adopting one of the above described configurations, the above Conditions (1)–(3) are satisfied in order to provide a compact, inner-focus type lens having its aberrations favorably corrected.

Condition (2) regulates the power of the second lens group $G_2$. If the lower limit of Condition (2) is not satisfied, the displacement of the second lens group $G_2$ becomes too large and the whole lens system becomes large. If the upper limit of Condition (2) is not satisfied, the sensitivity of component position on optical performance becomes high and the precision of manufacture required for each component becomes high, leading to an increase in cost and an increase in the number of assembly steps. Conditions (1) and (3) regulate the powers of the first lens group $G_1$ and the third lens group $G_3$, each of which, when the power of the second lens group $G_2$ is within the range of Condition (2), is set in the optimal range for correcting and balancing the various aberrations.

In addition, the various aberrations of the present invention can be more favorably corrected by satisfying the above Conditions (4) and (5). Condition (4) regulates the power of the first lens element $L_1$. If the lower limit of Condition (4) is not satisfied, variations of spherical aberration and curvature of field when photographing at a distance become too large. This is because the light refraction at the first lens element $L_1$ becomes large and the variation of the position where the light flux transits the lens by changing the photographing distance becomes large. If the upper limit of Condition (4) is exceeded, then the variations of spherical aberration and curvature of field when the photographing at a distance become too large. This is because there is a need for increasing the light refraction at the other positive lens elements.

Condition (5) regulates the power of the lens element $L_3$ in the first lens group $G_1$. If the lower limit of Condition (5) is not satisfied, it becomes difficult to correct the astigmatism. Also, the lateral color generated at the first lens group $G_1$ becomes large, and it becomes difficult to correct the entire lens system. If the upper limit of Condition (5) is exceeded, the refraction at lens element $L_3$ becomes large and the variation of the position where light flux transits the lens when changing the photographing distance becomes large. Also, the variations of spherical aberration and curvature of field when photographing at a distance become large.

The performance of the inner-focus type lens of the invention can be further improved by having the second lens element $L_2$ and the fourth lens element $L_4$ of the first lens group formed of optical material(s) which satisfies the above Condition (6). By using material(s) that satisfies Condition (6), lateral color can be favorably corrected. If the lower limit of Condition (6) is not satisfied, lateral color becomes excessive. If a lens has a focal length designed for a larger film size than the Brogne size, the finished photo will develop obvious color smears.

It is preferable that the third lens group $G_3$ be formed of lens elements, in sequential order from the object side: a biconvex lens element; a negative meniscus lens element having its convex surface on the image side; and a positive meniscus lens element having its convex surface on the image side. It is also preferable that the negative meniscus lens element of this lens group be made of an optical material that satisfies the above Condition (7). By satisfying Condition (7), the on-axis chromatic aberration can be made small. If the upper limit of Condition (7) is exceeded, the on-axis chromatic aberration becomes too excessive, especially when using it as a lens for a film size larger than the Brogne size. Thus, it is preferable to satisfy Condition (7) to obtain high-quality photos.

Although each of the above-discussed requirements for the material(s) and configuration of the lens elements in the first lens group $G_1$ and the third lens group $G_3$ are useful in and of themselves in improving the performance of the inner-focus type lens of the invention, a synergistic result is obtained when all of the above-discussed requirements are simultaneously satisfied.

Next, an alternative lens element configuration will be explained in general terms using FIG. 2. FIG. 2 shows the lens element configuration for the inner-focus type lens of Embodiment 8 (to be described in detail later). FIG. 2 differs from FIG. 1 in that the lens element configuration of the first lens group $G_1$ is different and, in the third lens group, the last two lens elements may be cemented together to form a cemented lens. Namely, in FIG. 2, the first lens group $G_1$ is formed of, in sequential order from the object side, a first lens element $L_1$ of positive refractive power having a meniscus shape with its convex surface on the object side, a second lens element $L_2$ of negative refractive power having a meniscus shape with its convex surface on the object side, and a third lens element $L_3$ of positive refractive power having a meniscus shape with its convex surface on the object side.

Figure 2:
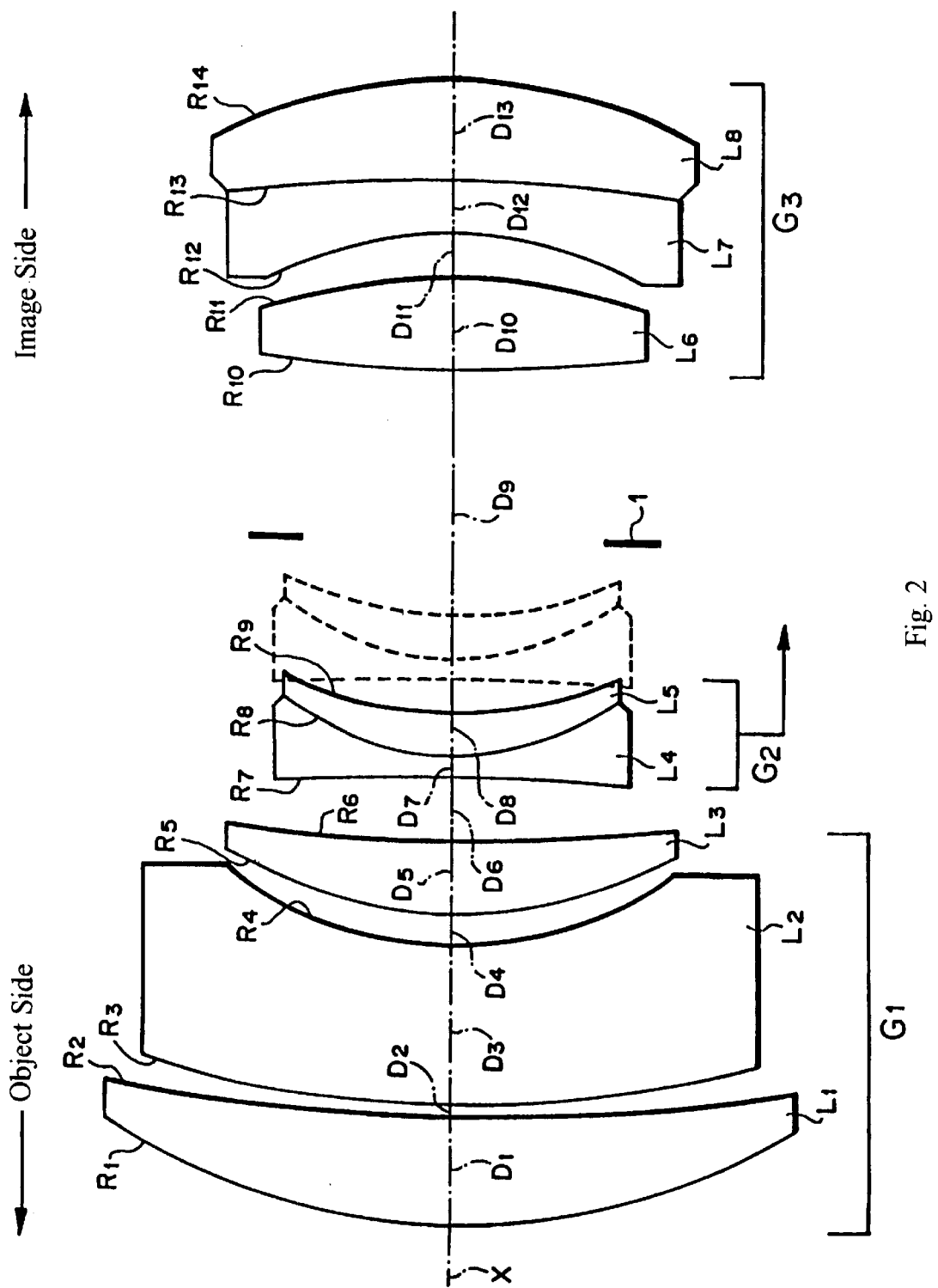
FIG. 2 shows the lens element configuration of Embodiment 8 of the present invention.
Figures 4A, 4B, 4C, 4D:
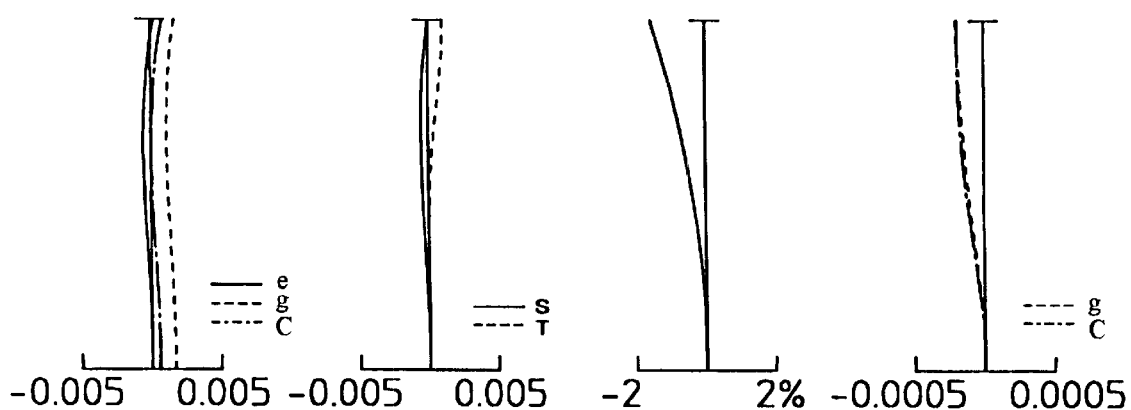
FIGS. 4A–4H are aberration curves for Embodiment 2.
Figures 4E, 4F, 4G, 4H:
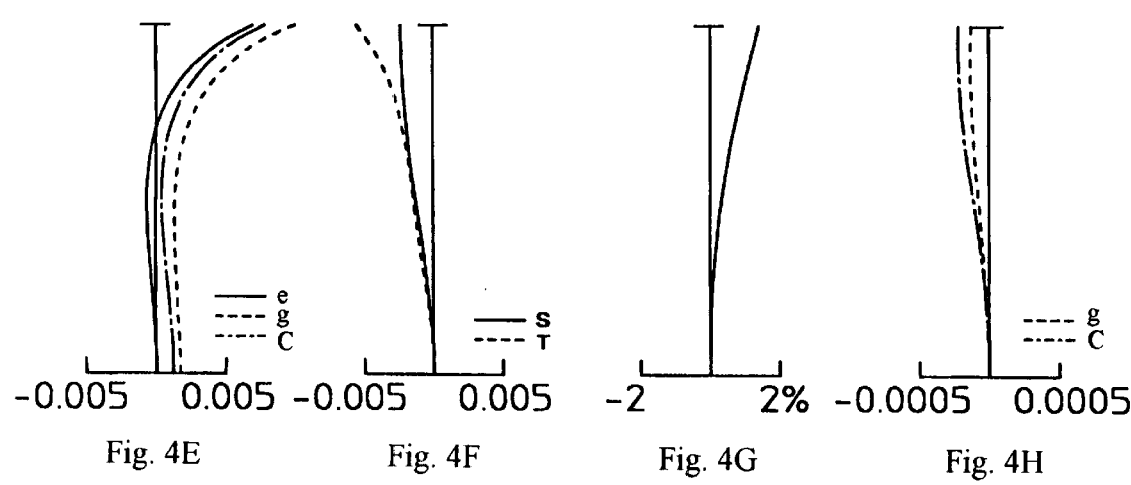
Figures 9A, 9B, 9C, 9D:
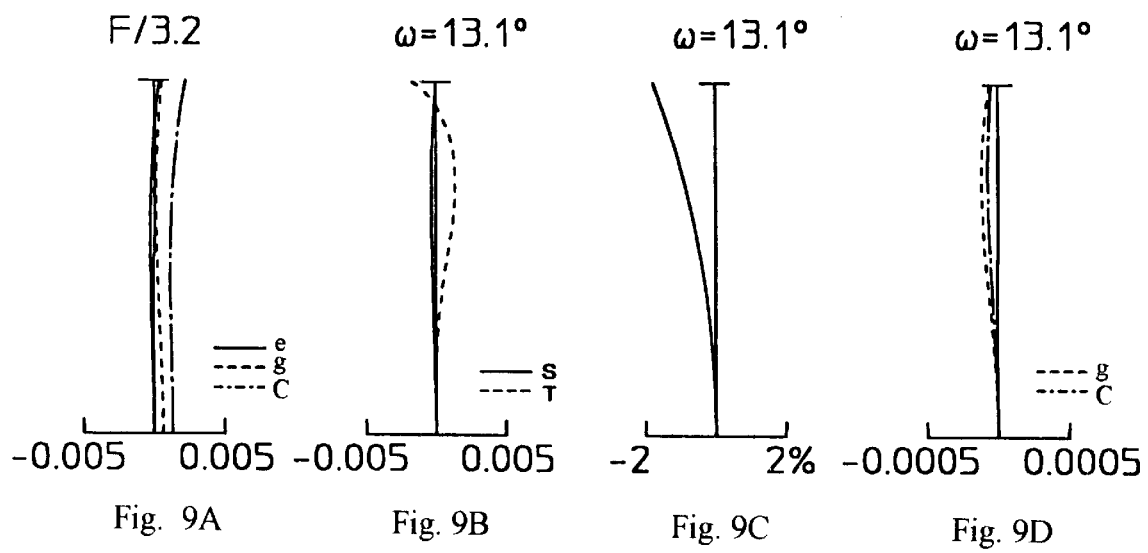
FIGS. 9A–9H are aberration curves for Embodiment 7.
Figures 9E, 9F, 9G, 9H:
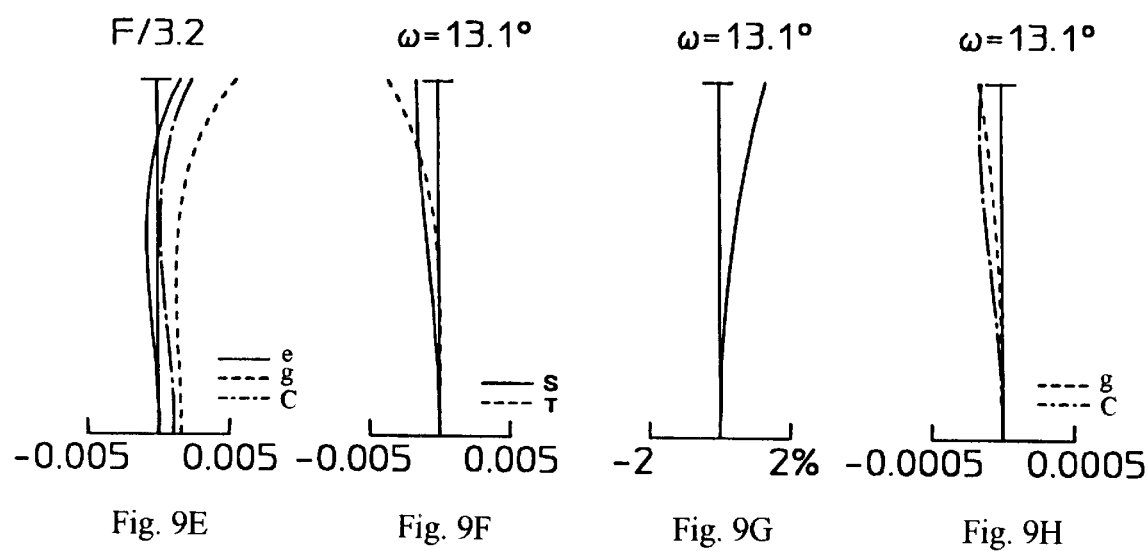
Figures 10A, 10B, 10C, 10D:
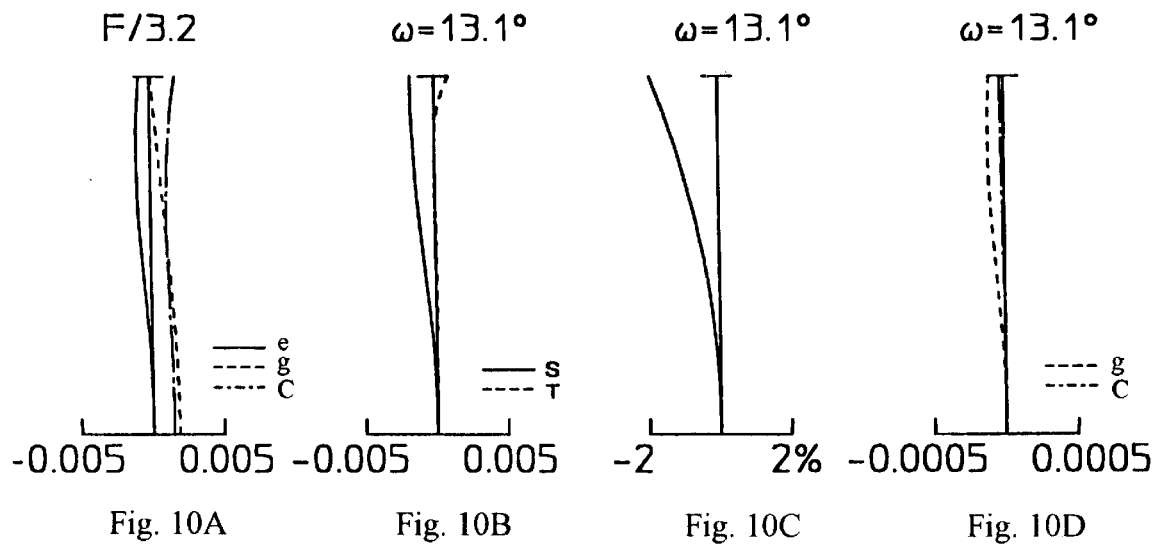
FIGS. 10A–10H are aberration curves for Embodiment 8.
Figures 10E, 10F, 10G, 10H:
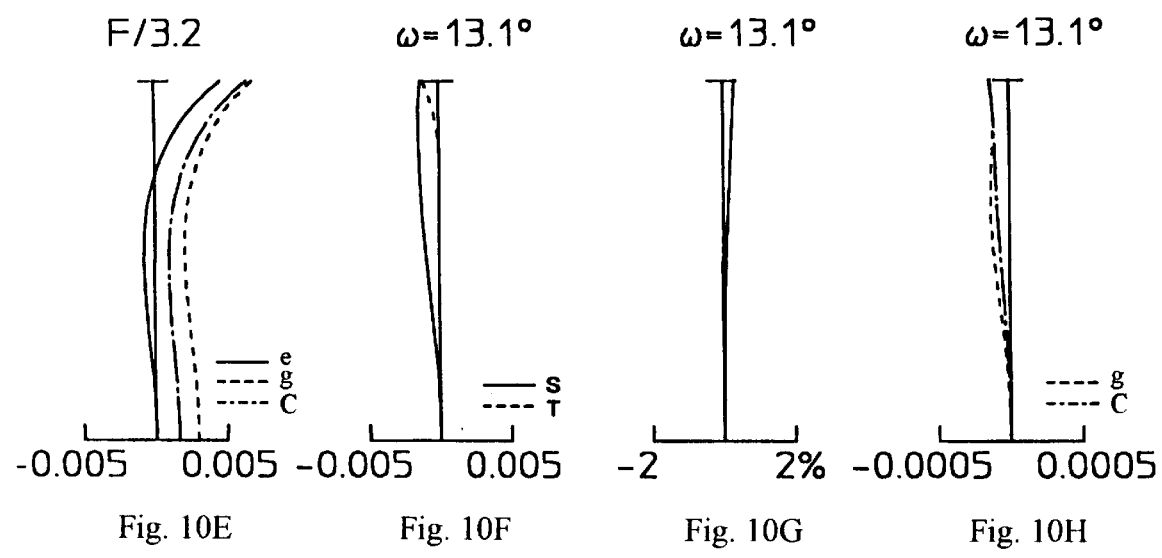

By employing the lens element configuration shown in FIG. 2 and satisfying Conditions (1)–(3) above, the same effect can be obtained as for the configuration as shown in FIG. 1. Also, by satisfying the above Conditions (4) and (5), the lens aberrations are sufficiently minimized, just as in the lens element configuration shown in FIG. 1, so as to enable photographing with a large film size. In FIG. 2, the negative lens element in the first lens group $G_1$, as specified by Condition (5), is the second lens element $L_2$.

The inner-focus type lens shown in FIG. 2 has the first lens group formed of, in sequential order from the object side, a first lens element $L_1$ of positive refractive power and a meniscus shape with its convex surface on the object side, a second lens element $L_2$ of negative refractive power and a meniscus shape with its convex surface on the object side, and a third lens element $L_3$ of positive refractive power and meniscus shape with its convex surface on the object side. Also, it is preferable that the third lens group $G_3$ be formed of, in sequential order from the object side, a sixth lens element $L_6$ that is biconvex, a seventh lens element $L_7$ of negative refractive power and a meniscus shape with its convex surface on the image side, and an eighth lens element $L_8$ of positive refractive power and a meniscus shape with its convex surface on the image side. Further, the negative meniscus lens element of this lens group (i.e., lens element $L_7$) is preferably made of a material that satisfies the above Condition (7). By using a material that satisfies Condition (7), the on-axis chromatic aberration can be made about as small as that of Embodiment 1 (discussed in detail later). Once again, although the above design criteria for the configuration of the first lens group $G_1$ and the third lens group $G_3$ and the specified lens material have a positive effect even when only one of these requirements is satisfied, a synergistic effect can be obtained by satisfying all requirements simultaneously.

Various embodiments of the invention will now be explained in detail.

Embodiment 1

As described above, the inner-focus type lens of Embodiment 1 has a lens element configuration as shown in FIG. 1.

Table 1 below lists the surface #, in order from the object side, the radius of curvature R (in mm), the on-axis spacing D (in mm) between surfaces, the index of refraction $N_e$ (at the e line, at λ=546.1 nm) and the Abbe number $v_d$ (at the d line, at λ=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle ω. In the bottom portion of the table are listed values relating to Conditions (1)–(6), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, and the focal length $f_{1N}$ of the negative lens element (i.e., the third lens element $L_3$) in the first lens group $G_1$, and values corresponding to $N_e+0.015\,v_d$ of the material of the second lens element $L_2$ and the fourth lens element $L_4$.

TABLE 1

| # | R | D | $N_e$ | $v_d$ |
|---|---|---|---|---|
| 1 | 0.42343 | 0.07107 | 1.77621 | 49.6 |
| 2 | 3.85964 | 0.00160 | | |
| 3 | 0.30558 | 0.05400 | 1.49845 | 81.6 |
| 4 | 0.94549 | 0.00973 | | |
| 5 | 2.15041 | 0.02033 | 1.69416 | 31.2 |
| 6 | 0.23598 | 0.02393 | | |
| 7 | 0.42167 | 0.03333 | 1.49845 | 81.6 |
| 8 | 1.92800 | 0.03327 | | |
| 9 | −7.90178 | 0.01200 | 1.67380 | 57.2 |
| 10 | 0.16670 | 0.02667 | 1.83932 | 37.2 |
| 11 | 0.27822 | 0.25294 | | |
| 12 | 0.80694 | 0.04000 | 1.56433 | 45.3 |
| 13 | −0.49884 | 0.03713 | | |
| 14 | −0.22037 | 0.01333 | 1.72538 | 34.7 |
| 15 | −2.21253 | 0.00320 | | |
| 16 | −1.32331 | 0.06347 | 1.77621 | 49.6 |
| 17 | −0.25914 | | | |

Fno. = 3.2      ω = 13.1°
$f_1 = 0.684$    $f_2 = -0.483$    $f_3 = 0.671$
$f_{1I} = 0.607$    $f_{1N} = -0.384$
Lens element $L_2$: $N_e + 0.015\,v_d = 2.722$
Lens element $L_4$: $N_e + 0.015\,v_d = 2.722$ As is apparent from comparing these above values with Conditions (1)–(6), each of Conditions (1)–(6) is satisfied for this embodiment.

FIGS. 3A–3D show, for Embodiment 1, the spherical aberration, curvature of field, distortion, and lateral color, respectively, with the object at infinity, and FIGS. 3E–3H show these respective aberrations for an object at a distance of 8.5 times the focal length of the projection lens. The values for each aberration curve are given for the focal length of the lens being normalized to 1 meter. In the curves for spherical aberration, the aberrations are shown for the e line, g line, and C line. In the curves for curvature of field, aberrations in both the sagittal (S) and the tangential (T) image planes are shown. Also, in the curves for lateral color, the aberrations of the g line and the C line (each using the e line image plane as the base image plane) are shown. As is clear from these figures, all of these aberrations are favorably corrected for this embodiment.

Embodiment 2

The inner-focus type lens of Embodiment 2 has about the same lens element configuration as that of Embodiment 1, and thus is not separately illustrated. The difference from Embodiment 1 is that the second lens group $G_2$ in this embodiment is formed of, in order from the object side, a fifth lens element $L_5$ that is a negative meniscus lens with its convex surface on the object side that is joined to a sixth lens element $L_6$ that is a positive meniscus lens element with its convex surface on the object side.

Table 2 below lists the surface #, in order from the object side, the radius of curvature R (in mm), the on-axis spacing D (in mm) between surfaces, the index of refraction $N_e$ (at the e line, i.e., at λ=546.1 nm) and the Abbe number $v_d$ (at the d line, i.e., at λ=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle ω. In the bottom portion of the table are listed values relating to Conditions (1)–(7), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, the focal length $f_{1N}$ of the negative lens element (i.e., the third lens element $L_3$) in the first lens group $G_1$, values corresponding to $N_e$+0.015 $v_d$ of the material of the second lens element $L_2$ and the fourth lens element $L_4$, a value corresponding to $\theta_{gF}$+0.0019 $v_d$ of the optical material of the eight lens element $L_8$, and the refractive indexes $N_g$, $N_F$, $N_C$, and $N_d$ of this optical material measured at the wavelengths 435.8 nm, 486.1 nm, 656.3 nm, and 587.6 nm, respectively.

TABLE 2

| # | R | D | $N_e$ | $v_d$ |
|---|---|---|---|---|
| 1 | 0.39957 | 0.07559 | 1.77621 | 49.6 |
| 2 | 1.40095 | 0.00667 | | |
| 3 | 0.27081 | 0.06703 | 1.49845 | 81.6 |
| 4 | 0.77805 | 0.02000 | | |
| 5 | 1.06317 | 0.02305 | 1.69416 | 31.2 |
| 6 | 0.19040 | 0.02756 | | |
| 7 | 0.34394 | 0.03334 | 1.49845 | 81.6 |
| 8 | 2.07266 | 0.03334 | | |
| 9 | 6.50174 | 0.01200 | 1.67380 | 57.2 |
| 10 | 0.16670 | 0.02667 | 1.83932 | 37.2 |
| 11 | 0.25806 | 0.22238 | | |
| 12 | 0.85421 | 0.04001 | 1.56433 | 45.3 |
| 13 | −0.36656 | 0.02444 | | |
| 14 | −0.21082 | 0.02547 | 1.72538 | 34.7 |
| 15 | −1.34158 | 0.00667 | | |
| 16 | −0.78424 | 0.07804 | 1.77621 | 49.6 |
| 17 | −0.25510 | | | |

Fno. = 3.2  ω = 13.1°
$f_1$ = 0.702   $f_2$ = −0.476   $f_3$ = 0.615
$f_{11}$ = 0.697   $f_{1N}$ = −0.338
Lens element $L_2$:  $N_e$ + 0.015 $v_d$ = 2.722
Lens element $L_4$:  $N_e$ + 0.015 $v_d$ = 2.722
Lens element $L_8$:  $\theta_{gF}$ + 0.0019 $v_d$ = 0.649
$N_g$ = 1.74721
$N_F$ = 1.73511
$N_C$ = 1.71436
$N_d$ = 1.72047

As is apparent from comparing these above values with Conditions (1)–(7), each of the Conditions (1)–(7) is satisfied for this embodiment.

FIGS. 4A–4D show, for Embodiment 2, the spherical aberration, curvature of field, distortion, and lateral color, respectively, with the object at infinity, and FIGS. 4E–4H show these respective aberrations for an object at a distance of 8.5 times the focal length of the projection lens. The values for each aberration curve are given for the focal length of the lens being normalized to 1 meter. In the curves for spherical aberration, the aberrations are shown for the e line, g line, and C line. In the curves for curvature of field, aberrations in both the sagittal (S) and the tangential (T) image planes are shown. Also, in the curves for lateral color, the aberrations of the g line and the C line (each using the e line image plane as the base image plane) are shown. As is clear from these figures, all of these aberrations are favorably corrected for this embodiment.

Embodiment 3

The inner-focus type lens of Embodiment 3 has the same basic lens element configuration as that of Embodiment 2.

Table 3 below lists the surface #, in order from the object side, the radius of curvature R (in mm), the on-axis spacing D (in mm) between surfaces, the index of refraction $N_e$ (at the e line, i.e., at λ=546.1 nm) and the Abbe number $v_d$ (at the d line, i.e., at λ=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle ω. In the bottom portion of the table are listed values relating to Conditions (1)–(7), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, the focal length $f_{1N}$ of the negative lens element (i.e., the third lens element $L_3$) in the first lens group $G_1$, values corresponding to $N_e$+0.015 $v_d$ of the material of the second lens element $L_2$ and the fourth lens element $L_4$, a value corresponding to $\theta_{gF}$+0.0019 $v_d$ of the optical material of the eight lens element $L_8$, and the refractive indexes $N_g$, $N_F$, $N_C$, and $N_d$ of this optical material at the wavelengths 435.8 nm, 486.1 nm, 656.3 nm, and 587.6 nm, respectively.

TABLE 3

| # | R | D | $N_e$ | $v_d$ |
|---|---|---|---|---|
| 1 | 0.42627 | 0.06501 | 1.77621 | 49.6 |
| 2 | 1.75415 | 0.00667 | | |
| 3 | 0.28596 | 0.05900 | 1.49845 | 81.6 |
| 4 | 0.83099 | 0.02000 | | |
| 5 | 1.21351 | 0.02276 | 1.69416 | 31.2 |
| 6 | 0.21402 | 0.02294 | | |
| 7 | 0.37332 | 0.03333 | 1.49845 | 81.6 |
| 8 | 2.99691 | 0.03333 | | |
| 9 | 24.70927 | 0.01200 | 1.67380 | 57.2 |
| 10 | 0.16667 | 0.02667 | 1.83932 | 37.2 |
| 11 | 0.26546 | 0.23333 | | |
| 12 | 0.88300 | 0.04176 | 1.56433 | 45.3 |
| 13 | −0.43780 | 0.03637 | | |
| 14 | −0.20982 | 0.01333 | 1.72538 | 34.7 |
| 15 | −1.22076 | 0.00667 | | |
| 16 | −0.83509 | 0.06890 | 1.77621 | 49.6 |
| 17 | −0.24871 | | | |

Fno. = 3.2  ω = 13.1°
$f_1$ = 0.679   $f_2$ = −0.478   $f_3$ = 0.658
$f_{11}$ = 0.710   $f_{1N}$ = −0.378
Lens element $L_2$:  $N_e$ + 0.015 $v_d$ = 2.722
Lens element $L_4$:  $N_e$ + 0.015 $v_d$ = 2.722
Lens element $L_8$:  $\theta_{gF}$ + 0.0019 $v_d$ = 0.649
$N_g$ = 1.74721
$N_F$ = 1.73511
$N_C$ = 1.71436
$N_d$ = 1.72047

As is apparent from comparing these above values with Conditions (1)–(7), each of the Conditions (1)–(7) is satisfied for this embodiment.

FIGS. 5A–5D show, for Embodiment 3, the spherical aberration, curvature of field, distortion, and lateral color, respectively, with the object at infinity, and FIGS. 5E–5H show these respective aberrations for an object at a distance of 8.5 times the focal length of the projection lens. The values for each aberration curve are given for the focal length of the lens being normalized to 1 meter. In the curves for spherical aberration the aberrations are shown for the e line, g line, and C line. In the curves for curvature of field, aberrations in both the sagittal (S) and tangential (T) image planes are shown. Also, in the curves for lateral color, the aberrations of the g line and the C line (using the e line image plane as the base image plane) are shown. As is clear from these figures, all of these aberrations are favorably corrected for this embodiment.

Embodiment 4

The inner-focus type lens of Embodiment 4 has the same basic lens element configuration as that of Embodiment 2.

Table 4 below lists the surface #, in order from the object side, the radius of curvature R (in mm), the on-axis spacing D (in mm) between surfaces, the index of refraction $N_e$ (at the e line, i.e., at $\lambda$=546.1 nm) and the Abbe number $\nu_d$ (at the d line, i.e., at $\lambda$=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle $\omega$. In the bottom portion of the table are listed values relating to Conditions (1)–(7), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, the focal length $f_{1N}$ of the negative lens element (i.e., the third lens element $L_3$) in the first lens group $G_1$, values corresponding to $N_e$+0.015 $\nu_d$ of the material of the second lens element $L_2$ and the fourth lens element $L_4$, a value corresponding to $\theta_{gF}$+0.0019 $\nu_d$ of the optical material of the eight lens element $L_8$, and the refractive indexes $N_g$, $N_F$, $N_C$, and $N_d$ of this optical material at the wavelengths 435.8 nm, 486.1 nm, 656.3 nm, and 587.6 nm, respectively.

TABLE 4

| # | R | D | $N_e$ | $\nu_d$ |
|---|---|---|---|---|
| 1 | 0.41208 | 0.06629 | 1.77621 | 49.6 |
| 2 | 2.07738 | 0.00133 | | |
| 3 | 0.29562 | 0.05582 | 1.49845 | 81.6 |
| 4 | 0.78497 | 0.01749 | | |
| 5 | 1.45773 | 0.02290 | 1.69416 | 31.2 |
| 6 | 0.22210 | 0.02216 | | |
| 7 | 0.37232 | 0.03333 | 1.49845 | 81.6 |
| 8 | 3.88883 | 0.03333 | | |
| 9 | 13.44195 | 0.01200 | 1.67380 | 57.2 |
| 10 | 0.16667 | 0.02667 | 1.83932 | 37.2 |
| 11 | 0.25987 | 0.24390 | | |
| 12 | 0.90412 | 0.04000 | 1.56433 | 45.3 |
| 13 | −0.46216 | 0.03862 | | |
| 14 | −0.21283 | 0.01333 | 1.72538 | 34.7 |
| 15 | −1.06614 | 0.00667 | | |
| 16 | −0.77423 | 0.06443 | 1.77621 | 49.6 |
| 17 | −0.24987 | | | |

Fno. = 3.2    $\omega$ = 13.1°
$f_1$ = 0.648    $f_2$ = −0.468    $f_3$ = 0.679
$f_{1I}$ = 0.651    $f_{1N}$ = −0.380
Lens element $L_2$: $N_e$ + 0.015 $\nu_d$ = 2.722
Lens element $L_4$: $N_e$ + 0.015 $\nu_d$ = 2.722
Lens element $L_8$: $\theta_{gF}$ + 0.019 $\nu_d$ = 0.649
$N_g$ = 1.74721
$N_F$ = 1.73511
$N_C$ = 1.71436
$N_d$ = 1.72047

As is apparent from comparing these above values with Conditions (1)–(7), each of the Conditions (1)–(7) is satisfied for this embodiment.

FIGS. 6A–6D show, for Embodiment 4, the spherical aberration, curvature of field, distortion, and lateral color, respectively, with the object at infinity, and FIGS. 6E–6H show these respective aberrations for an object at a distance of 8.5 times the focal length of the projection lens. The values for each aberration curve are given for the focal length of the lens being normalized to 1 meter. In the curves for spherical aberration, the aberrations are shown for the e line, g line, and C line. In the curves for curvature of field, aberrations in both the sagittal (S) and the tangential (T) image planes are shown. Also, in the curves for lateral color, the aberrations of the g line and the C line (each using the e line image plane as the base image plane) are shown. As is clear from these figures, all of these aberrations are favorably corrected for this embodiment.

Embodiment 5

The inner-focus type lens of Embodiment 5 has the same basic lens element configuration as that of Embodiment 1.

Table 5 below lists the surface #, in order from the object side, the radius of curvature R (in mm), the on-axis spacing D (in mm) between surfaces, the index of refraction $N_e$ (at the e line, i.e., at $\lambda$=546.1 nm) and the Abbe number $\nu_d$ (at the d line, i.e., at $\lambda$=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle $\omega$. In the bottom portion of the table are listed values relating to Conditions (1)–(5), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, and the focal length $f_{1N}$ of the negative lens element (i.e., the third lens element $L_3$) in the first lens group $G_1$.

TABLE 5

| # | R | D | $N_e$ | $\nu_d$ |
|---|---|---|---|---|
| 1 | 0.41608 | 0.07088 | 1.77621 | 49.6 |
| 2 | 2.84793 | 0.00133 | | |
| 3 | 0.30277 | 0.05333 | 1.49845 | 81.6 |
| 4 | 0.85835 | 0.01148 | | |
| 5 | 1.77077 | 0.02000 | 1.69416 | 31.2 |
| 6 | 0.23239 | 0.02531 | | |
| 7 | 0.42436 | 0.03333 | 1.49845 | 81.6 |
| 8 | 2.15612 | 0.03333 | | |
| 9 | −11.39750 | 0.01200 | 1.67380 | 57.2 |
| 10 | 0.16666 | 0.02667 | 1.83932 | 37.2 |
| 11 | 0.27954 | 0.24069 | | |
| 12 | 0.77171 | 0.04000 | 1.56433 | 45.3 |
| 13 | −0.49975 | 0.03397 | | |
| 14 | −0.21751 | 0.01333 | 1.72538 | 34.7 |
| 15 | −2.07488 | 0.00667 | | |
| 16 | −1.18462 | 0.06049 | 1.77621 | 49.6 |
| 17 | −0.25516 | | | |

Fno. = 3.2    $\omega$ = 13.1°
$f_1$ = 0.697    $f_2$ = −0.493    $f_3$ = 0.673
$f_{1I}$ = 0.620    $f_{1N}$ = −0.387

As is apparent from comparing these above values with Conditions (1)–(5), each of the Conditions (1)–(5) is satisfied for this embodiment.

FIGS. 7A–7D show, for Embodiment 5, the spherical aberration, curvature of field, distortion, and lateral color, respectively, with the object at infinity, and FIGS. 7E–7H show these respective aberrations for an object at a distance of 8.5 times the focal length of the projection lens. The values for each aberration curve are given for the focal length of the lens being normalized to 1 meter. In the curves for spherical aberration, the aberrations are shown for the e line, g line, and C line. In the curves for curvature of field, aberrations in both the sagittal (S) and the tangential (T) image planes are shown. Also, in the curves for lateral color, the aberrations of the g line and the C line (each using the e line image plane as the base image plane) are shown. As is clear from these figures, all of these aberrations are favorably corrected for this embodiment.

Embodiment 6

The inner-focus type lens of Embodiment 6 has roughly the same basic lens element configuration as that of Embodiment 1. Embodiment 6 differs in that, in the first lens group $G_1$, the second lens element $L_2$ is a positive meniscus lens element with its convex surface on the object side that is cemented to a third lens element $L_3$ that is a negative meniscus lens with its convex surface on the object side. In the second lens group $G_2$, the fifth lens element $L_5$ is a negative meniscus lens with its convex surface on the object side that is cemented to the sixth lens element $L_6$. In the third lens group the eight lens element $L_8$ and the ninth lens element $L_9$ have adjacent surfaces of the same radius of curvature that are cemented together so as to form a joined lens.

Table 6 below lists the surface #, in order from the object side, the radius of curvature R (in mm), the on-axis spacing D (in mm) between surfaces, the index of refraction $N_e$ (at the e line, i.e., at λ=546.1 nm) and the Abbe number $v_d$ (at the d line, i.e., at λ=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle ω. In the bottom portion of the table are listed values relating to Conditions (1)–(7), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, and the focal length $f_{1N}$ of the negative lens element (i.e., the third lens element $L_3$) in the first lens group $G_1$, values corresponding to $N_e+0.015\, v_d$ of the material of the second lens element $L_2$ and the fourth lens element $L_4$, a value corresponding to $\theta_{gF}+0.0019\, v_d$ of the optical material of the eight lens element $L_8$, and the refractive indexes $N_g$, $N_F$, $N_C$, and $N_d$ of this optical material at the wavelengths 435.8 nm, 486.1 nm, 656.3 nm, and 587.6 nm, respectively.

TABLE 6

| # | R | D | $N_e$ | $v_d$ |
|---|---|---|---|---|
| 1 | 0.47936 | 0.06913 | 1.79982 | 48.4 |
| 2 | 1.02600 | 0.00133 | | |
| 3 | 0.31759 | 0.09334 | 1.73243 | 55.0 |
| 4 | 0.53385 | 0.02333 | 1.80757 | 25.0 |
| 5 | 0.21528 | 0.04257 | | |
| 6 | 0.33471 | 0.06667 | 1.56155 | 62.7 |
| 7 | 1.63423 | 0.03939 | | |
| 8 | 6.40146 | 0.01400 | 1.59143 | 61.2 |
| 9 | 0.14435 | 0.04580 | 1.62409 | 36.3 |
| 10 | 0.25343 | 0.20772 | | |
| 11 | 2.13582 | 0.06667 | 1.56433 | 45.3 |
| 12 | −0.30838 | 0.03527 | | |
| 13 | −0.19677 | 0.03334 | 1.76894 | 32.6 |
| 14 | −29.60510 | 0.08000 | 1.80403 | 47.2 |
| 15 | −0.25649 | | | |

Fno. = 3.2  ω = 13.1°
$f_1 = 0.693$    $f_2 = -0.472$    $f_3 = 0.601$
$f_{1I} = 1.065$    $f_{1N} = -0.462$
Lens element $L_2$: $N_e + 0.015\, v_d = 2.722$
Lens element $L_4$: $N_e + 0.015\, v_d = 2.722$
Lens element $L_8$: $\theta_{gF} + 0.0019\, v_d = 0.649$
$N_g = 1.74721$
$N_F = 1.73511$
$N_C = 1.71436$
$N_d = 1.72047$ As is apparent from comparing these above values with Conditions (1)–(7), each of the Conditions (1)–(7) is satisfied for this embodiment.

FIGS. 8A–8D show, for Embodiment 6, the spherical aberration, curvature of field, distortion, and lateral color, respectively, with the object at infinity, and FIGS. 8E–8H show these respective aberrations for an object at a distance of 8.5 times the focal length of the projection lens. The values for each aberration curve are given for the focal length of the lens being normalized to 1 meter. In the curves for spherical aberration, the aberrations are shown for the e line, g line, and C line. In the curves for curvature of field, aberrations in both the sagittal (S) and the tangential (T) image planes are shown. Also, in the curves for lateral color, the aberrations of the g line and the C line (each using the e line image plane as the base image plane) are shown. As is clear from these figures, all of these aberrations are favorably corrected for this embodiment.

Embodiment 7

The inner-focus type lens of Embodiment 7 has the same basic lens element configuration as that of Embodiment 6.

Table 7 below lists the surface #, in order from the object side, the radius of curvature R (in mm), the on-axis spacing D (in mm) between surfaces, the index of refraction $N_e$ (at the e line, i.e., at λ=546.1 nm) and the Abbe number $v_d$ (at the d line, i.e., at λ=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle ω. In the bottom portion of the table are listed values relating to Conditions (1)–(7), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, the focal length $f_{1N}$ of the negative lens element (i.e., the third lens element $L_3$) in the first lens group $G_1$, and values corresponding to $N_e+0.015\, v_d$ of the material of the second lens element $L_2$ and the fourth lens element $L_4$, values corresponding to $N_e+0.015\, v_d$ of the material of the second lens element $L_2$ and the fourth lens element $L_4$, a value corresponding to $\theta_{gF}+0.0019\, v_d$ of the optical material of the eight lens element $L_8$, and the refractive indexes $N_g$, $N_F$, $N_C$, and $N_d$ of this optical material at the wavelengths 435.8 nm, 486.1 nm, 656.3 nm, and 587.6 nm, respectively.

TABLE 7

| # | R | D | $N_e$ | $v_d$ |
|---|---|---|---|---|
| 1 | 0.51139 | 0.06001 | 1.78287 | 50.1 |
| 2 | 2.40931 | 0.00667 | | |
| 3 | 0.23958 | 0.09334 | 1.49845 | 81.6 |
| 4 | 0.75431 | 0.02333 | 1.66922 | 32.5 |
| 5 | 0.18166 | 0.04000 | | |
| 6 | 0.30732 | 0.04000 | 1.49845 | 81.6 |
| 7 | 0.69148 | 0.03334 | | |
| 8 | 5.43649 | 0.01200 | 1.72233 | 50.8 |
| 9 | 0.11616 | 0.04000 | 1.75345 | 38.3 |
| 10 | 0.28341 | 0.17712 | | |
| 11 | 0.91775 | 0.06667 | 1.56433 | 45.3 |
| 12 | −0.34185 | 0.01253 | | |
| 13 | −0.19603 | 0.03334 | 1.80263 | 32.5 |
| 14 | −1.37203 | 0.08001 | 1.80811 | 46.6 |
| 15 | −0.25291 | | | |

Fno. = 3.2  ω = 13.1°
$f_1 = 0.705$    $f_2 = -0.448$    $f_3 = 0.588$
$f_{1I} = 0.818$    $f_{1N} = -0.363$
Lens element $L_2$: $N_e + 0.015\, v_d = 2.722$
Lens element $L_4$: $N_e + 0.015\, v_d = 2.722$
Lens element $L_8$: $\theta_{gF} + 0.0019\, v_d = 0.649$
$N_g = 1.74721$
$N_F = 1.73511$
$N_C = 1.71436$
$N_d = 1.72047$ As is apparent from comparing these above values with Conditions (1)–(7), each of the Conditions (1)–(7) is satisfied for this embodiment.

FIGS. 9A–9D show, for Embodiment 7, the spherical aberration, curvature of field, distortion, and lateral color, respectively, with the object at infinity, and FIGS. 9E–9H show these respective aberrations for an object at a distance of 8.5 times the focal length of the projection lens. The values for each aberration curve are given for the focal length of the lens being normalized to 1 meter. In the curves for spherical aberration, the aberrations are shown for the e line, g line, and C line. In the curves for curvature of field, aberrations in both the sagittal (S) and the tangential (T) image planes are shown. Also, in the curves for lateral color, the aberrations of the g line and the C line (each using the e line image plane as the base image plane) are shown. As is clear from these figures, all of these aberrations are favorably corrected for this embodiment.

Embodiment 8

As described above, the inner-focus type lens of Embodiment 8 has the lens element configuration shown in FIG. 2. Namely, in this embodiment, the first lens group $G_1$ is formed of, in sequential order from the object side, a first lens element $L_1$ of positive refractive power having a meniscus shape with its convex surface on the object side, a second lens element $L_2$ of negative refractive power having a meniscus shape with its convex surface on the object side, and a third lens element $L_3$ of positive refractive power having a meniscus shape with its convex surface on the object side. The second lens group $G_2$ is formed of, in sequential order from the object side, a fourth lens element $L_4$ that is biconcave and has surfaces of different radii of curvature, with the surface having the smaller radius of curvature on the image side and cemented to a fifth lens element $L_5$. The fifth lens element $L_5$ has positive refractive power and a meniscus shape with its convex surface on the object side. The third lens group $G_3$ is formed of, in sequential order from the object side, a sixth lens element $L_6$ that is biconvex with surfaces of different radii of curvature, with the surface of smaller radius of curvature on the image side, a seventh lens element $L_7$ of negative refractive power and a meniscus shape with its convex surface on the image side, and an eighth lens element $L_8$ of positive refractive power and a meniscus shape with its convex surface on the image side.

Table 8 below lists the surface #, in order from the object side, the radius of curvature R (in mm), the on-axis spacing D (in mm) between surfaces, the index of refraction $N_e$ (at the e line, i.e., at λ=546.1 nm) and the Abbe number $v_d$ (at the d line, i.e., at λ=587.6 nm) of each lens element of this embodiment. The radius of curvature R and on-axis distance D have been normalized so as to provide an inner-focus type lens having a focal length of unity. In the middle portion of the table are listed the f-number Fno. and the half-field angle ω. In the bottom portion of the table are listed values relating to Conditions (1)–(5), namely, the focal length $f_1$ of the first lens group $G_1$, the focal length $f_2$ of the second lens group $G_2$, the focal length $f_3$ of the third lens group $G_3$, the focal length $f_{1I}$ of the most object-side lens element (i.e., lens element $L_1$) in the first lens group $G_1$, the focal length $f_{1N}$ of the negative lens element (i.e., the second lens element $L_2$) in the first lens group $G_1$.

TABLE 8

| # | R | D | $N_e$ | $v_d$ |
|---|---|---|---|---|
| 1 | 0.43421 | 0.07249 | 1.79226 | 47.4 |
| 2 | 1.35176 | 0.00362 | | |
| 3 | 0.73181 | 0.10903 | 1.80689 | 24.6 |

TABLE 8-continued

| # | R | D | $N_e$ | $v_d$ |
|---|---|---|---|---|
| 4 | 0.24698 | 0.02175 | | |
| 5 | 0.29572 | 0.05075 | 1.75844 | 52.4 |
| 6 | 1.25058 | 0.02900 | | |
| 7 | −2.12955 | 0.01450 | 1.56181 | 61.2 |
| 8 | 0.18124 | 0.02900 | 1.76255 | 31.7 |
| 9 | 0.27597 | 0.23372 | | |
| 10 | 0.93143 | 0.06524 | 1.51357 | 50.9 |
| 11 | −0.38702 | 0.02900 | | |
| 12 | −0.26259 | 0.03562 | 1.76859 | 26.5 |
| 13 | −1.12665 | 0.06835 | 1.80984 | 39.6 |
| 14 | −0.33502 | | | |

Fno. = 3.2  ω = 13.1°
$f_1$ = 0.760  $f_2$ = −0.531  $f_3$ = 0.683
$f_{1I}$ = 0.780  $f_{1N}$ = −0.514

As is apparent from comparing these above values with Conditions (1)–(5), each of the Conditions (1)–(5) is satisfied for this embodiment.

FIGS. 10A–10D show, for Embodiment 8, the spherical aberration, curvature of field, distortion, and lateral color, respectively, with the object at infinity, and FIGS. 10E–10H show these respective aberrations for an object at a distance of 8.5 times the focal length of the projection lens. The values for each aberration curve are given for the focal length of the lens being normalized to 1 meter. In the curves for spherical aberration, the aberrations are shown for the e line, g line, and C line. In the curves for curvature of field, aberrations in both the sagittal (S) and the tangential (T) image planes are shown. Also, in the curves for lateral color, the aberrations of the g line and the C line (each using the e line image plane as the base image plane) are shown. As is clear from these figures, all of these aberrations are favorably corrected for this embodiment.

As explained above, the lens configuration, of the inner-focus type lens of this invention can favorably correct aberrations while being compact. The optical performance of the inner-focus type lens of this invention has a focal length of 200 mm when scaled to produce an image for 6×8 size film. This results in a lens that can provide photographs of fine quality even when used as a photographic lens for a camera having a large film size.

The invention being thus described, it will be obvious that the same may be varied in many ways. For example, whereas certain lens elements in the above embodiments are joined to form one or more cemented lenses, similar performance can be obtained even if these lens elements are not joined with each other and are, instead, separate. For example, the second lens group $G_2$ need not be formed of a cemented lens and can instead be a negative lens element and a positive lens element that are arranged sequentially from the object side. In addition, the values of R and D may be readily scaled to achieve a lens of a desired focal length. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. An inner-focus type lens comprising, in sequential order from the object side:

a first lens group having a positive refractive power and formed of, in sequential order from the object side and without any intervening lens element, one or two positive lens element(s), a negative lens element, and a positive lens element;

a second lens group having a negative refractive power and formed of, in sequential order from the object side, a negative lens element and a positive lens element;

a third lens group having a positive refractive power and formed of, in sequential order from the object side, a positive lens element, a negative lens element, and a positive lens element;

wherein there are no intervening lens elements between the first and second lens groups and focusing is performed by moving the second lens group as one unit along the optical axis, and the following Conditions (1)–(3) are satisfied $$0.58 < f_1/f < 0.84 \qquad \text{Condition (1)}$$

$$-0.58 < f_2/f < -0.4 \qquad \text{Condition (2)}$$

$$0.54 < f_3/f < 1.2 \qquad \text{Condition (3)}$$

where f is the focal length of the entire lens when focused on an object at infinity, $f_1$ is the focal length of the first lens group, $f_2$ is the focal length of the second lens group, and $f_3$ is the focal length of the third lens group.

2. The inner-focus type lens of claim 1, wherein the following Conditions (4) and (5) are also satisfied:

$$0.5 < f_{1f}/f < 1.2 \qquad \text{Condition (4)}$$

$$-0.6 < f_{1N}/f < -0.3 \qquad \text{Condition (5)}$$

where f is the focal length of the entire lens when focused on an object at infinity, $f_{1f}$ is the focal length of the most object-side lens element in the first lens group, and $f_{1N}$ is the focal length of the negative lens element in the first lens group.

3. The inner-focus type lens of claim 1, wherein the first lens group is formed of, in sequential order from the object side:

a first lens element of positive refractive power having a meniscus shape with its convex surface on the object side;

a second lens element of positive refractive power having a meniscus shape with its convex surface on the object side;

a third lens element of negative refractive power having a meniscus shape with its convex surface on the object side; and a fourth lens element of positive refractive power having a meniscus shape with its convex surface on the object side.

4. The inner-focus type lens of claim 2, wherein the first lens group is formed of, in sequential order from the object side:

a first lens element of positive refractive power having a meniscus shape with its convex surface on the object side;

a second lens element of positive refractive power having a meniscus shape with its convex surface on the object side;

a third lens element of negative refractive power having a meniscus shape with its convex surface on the object side; and a fourth lens element of positive refractive power having a meniscus shape with its convex surface on the object side.

5. The inner-focus type lens of claim 3 wherein the second lens element and the fourth lens element of the first lens group are made of a material that satisfies the following Condition (6):

$$N_e + 0.015 \upsilon_d > 2.58 \qquad \text{Condition (6)}$$

where $N_e$ is the index of refraction of the lens material at wavelength 546.1 nm, and $\upsilon_d$ is the Abbe number of the lens material at wavelength 587.6 nm.

6. The inner-focus type lens of claim 4 wherein the second lens element and the fourth lens element of the first lens group are made of a material that satisfies the following Condition (6):

$$N_e + 0.015 \upsilon_d > 2.58 \qquad \text{Condition (6)}$$

where $N_e$ is the index of refraction of the lens material at wavelength 546.1 nm, and $\upsilon_d$ is the Abbe number of the lens material at wavelength 587.6 nm.

7. The inner-focus type lens of claim 1 wherein the first lens group is formed of, in sequential order from the object side:

a first lens element of positive refractive power having a meniscus shape with its convex surface on the object side;

a second lens element of negative refractive power having a meniscus shape with its convex surface on the object side; and a third lens element of positive refractive power having a meniscus shape with its convex surface on the object side.

8. The inner-focus type lens of claim 2 wherein the first lens group is formed of, in sequential order from the object side:

a first lens element of positive refractive power having a meniscus shape with its convex surface on the object side;

a second lens element of negative refractive power having a meniscus shape with its convex surface on the object side; and a third lens element of positive refractive power having a meniscus shape with its convex surface on the object side.

9. The inner-focus type lens of claim 1, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

10. The inner-focus type lens of claim 2, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

11. The inner-focus type lens of claim 3, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

12. The inner-focus type lens of claim 4, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

13. The inner-focus type lens of claim 5, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

14. The inner-focus type lens of claim 6, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

15. The inner-focus type lens of claim 7, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

16. The inner-focus type lens of claim 8, wherein the third lens group is formed of, in sequential order from the object side:

a biconvex lens element;

a lens element of negative refractive power having a meniscus shape with its convex surface on the image side; and a lens element of positive refractive power having a meniscus shape with its convex surface on the image side.

17. The inner-focus type lens of claim 9, wherein the lens element of negative refractive power in the third lens group having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

18. The inner-focus type lens of claim 10, wherein the lens element of negative refractive power in the third lens group having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

19. The inner-focus type lens of claim 11, wherein the lens element of negative refractive power in the third lens group having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

20. The inner-focus type lens of claim 12, wherein the lens element in the third lens group of negative refractive power having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

21. The inner-focus type lens of claim 13, wherein the lens element in the third lens group of negative refractive power having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

22. The inner-focus type lens of claim 14, wherein the lens element in the third lens group of negative refractive power having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

23. The inner-focus type lens of claim 15, wherein the lens element in the third lens group of negative refractive power having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

24. The inner-focus type lens of claim 16, wherein the lens element in the third lens group of negative refractive power having a meniscus shape with its convex surface on the image side is made of a material that satisfies the following Condition (7):

$$\theta_{gF}+0.0019\upsilon_d<0.650 \qquad \text{Condition (7)}$$

where $\theta_{gF}$ is the partial dispersion ratio of the optical material, defined by $\theta_{gF}=(N_g-N_F)/(N_F-N_C)$, $\upsilon_d$ is the Abbe number of the optical material defined by $\upsilon_d=(N_d-1)/(N_F-N_C)$, $N_g$ is the index of refraction of the optical material at wavelength 435.8 nm, $N_F$ is the index of refraction of the optical material at wavelength 486.1 nm, $N_C$ is the index of refraction of the optical material at wavelength 656.3 nm, and $N_d$ is the index of refraction of the optical material at wavelength 587.6 nm.

25. An inner-focus type lens comprising, in sequential order from the object side:

a first lens group having a positive refractive power and formed of, in sequential order from the object side and without any intervening lens element, one or two positive lens element(s), a negative lens element, and a positive lens element;

a second lens group having a negative refractive power and formed of, in sequential order from the object side, a negative lens element and a positive lens element;

a third lens group having a positive refractive power and formed of, in sequential order from the object side, a positive lens element, a negative lens element, and a positive lens element;

wherein there are no intervening lens elements between the first and second lens groups and focusing is performed by moving the second lens group as one unit along the optical axis.

26. An inner-focus type lens comprising, in sequential order from the object side:

a first lens group that is formed of, in sequential order from the object side, a first lens element of positive refractive power having a meniscus shape with its convex surface on the object side;

a second lens element of positive refractive power having a meniscus shape with its convex surface on the object side;

a third lens element of negative refractive power having a meniscus shape with its convex surface on the object side; and a fourth lens element of positive refractive power having a meniscus shape with its convex surface on the object side;

a second lens group having a negative refractive power and formed of, in sequential order from the object side, a negative lens element and a positive lens element; and a third lens group having a positive refractive power and formed of, in sequential order from the object side, a positive lens element, a negative lens element, and a positive lens element;

wherein focusing is performed by moving the second lens group as one unit along the optical axis, and the following Conditions (1)–(3) are satisfied $0.58 < f_1/f < 0.84$  Condition (1)

$-0.58 < f_2/f < -0.4$  Condition (2)

$0.54 < f_3/f < 1.2$  Condition (3)

where f is the focal length of the entire lens when focused on an object at infinity, $f_1$ is the focal length of the first lens group, $f_2$ is the focal length of the second lens group, and $f_3$ is the focal length of the third lens group.

27. An inner-focus type lens comprising, in sequential order from the object side:

a first lens group that is formed of, in sequential order from the object side, a first lens element of positive refractive power having a meniscus shape with its convex surface on the object side, a second lens element of positive refractive power having a meniscus shape with its convex surface on the object side, a third lens element of negative refractive power having a meniscus shape with its convex surface on the object side, and a fourth lens element of positive refractive power having a meniscus shape with its convex surface on the object side;

a second lens group having a negative refractive power and formed of, in sequential order from the object side, a negative lens element and a positive lens element; and a third lens group having a positive refractive power and formed of, in sequential order from the object side, a positive lens element, a negative lens element, and a positive lens element;

wherein focusing is performed by moving the second lens group as one unit along the optical axis, and the following Conditions (1)–(5) are satisfied $0.58 < f_1/f < 0.84$  Condition (1)

$-0.58 < f_2/f < -0.4$  Condition (2)

$0.54 < f_3/f < 1.2$  Condition (3)

$0.5 < f_{1I}/f < 1.2$  Condition (4)

$-0.6 < f_{1N}/f < -0.3$  Condition (5)

where f is the focal length of the entire lens when focused on an object at infinity, $f_1$ is the focal length of the first lens group, $f_2$ is the focal length of the second lens group, $f_3$ is the focal length of the third lens group, $f_{1I}$ is the focal length of the most object-side lens element in the first lens group, and $f_{1N}$ is the focal length of the negative lens element in the first lens group.

28. An inner-focus type lens comprising, in sequential order from the object side:

a first lens group that is formed of, in sequential order from the object side, a first lens element of positive refractive power having a meniscus shape with its convex surface on the object side;

a second lens element of negative refractive power having a meniscus shape with its convex surface on the object side; and a third lens element of positive refractive power having a meniscus shape with its convex surface on the object side;

a second lens group having a negative refractive power and formed of, in sequential order from the object side, a negative lens element and a positive lens element;

a third lens group having a positive refractive power and formed of, in sequential order from the object side, a positive lens element, a negative lens element, and a positive lens element;

wherein focusing is performed by moving the second lens group as one unit along the optical axis, and the following Conditions (1)–(3) are satisfied $0.58 < f_1/f < 0.84$  Condition (1)

$-0.58 < f_2/f < -0.4$  Condition (2)

$0.54 < f_3/f < 1.2$  Condition (3)

where f is the focal length of the entire lens when focused on an object at infinity, $f_1$ is the focal length of the first lens group, $f_2$ is the focal length of the second lens group, and $f_3$ is the focal length of the third lens group.

29. An inner-focus type lens comprising, in sequential order from the object side:

a first lens group that is formed of, in sequential order from the object side, a first lens element of positive refractive power having a meniscus shape with its convex surface on the object side;

a second lens element of negative refractive power having a meniscus shape with its convex surface on the object side; and a third lens element of positive refractive power having a meniscus shape with its convex surface on the object side;

a second lens group having a negative refractive power and formed of, in sequential order from the object side, a negative lens element and a positive lens element;

a third lens group having a positive refractive power and formed of, in sequential order from the object side, a positive lens element, a negative lens element, and a positive lens element;

wherein focusing is performed by moving the second lens group as one unit along the optical axis, and the following Conditions (1)–(5) are satisfied $0.58 < f_1/f < 0.84$     Condition (1)

$-0.58 < f_2/f < -0.4$     Condition (2)

$0.54 < f_3/f < 1.2$     Condition (3)

$0.5 < f_{1I}/f < 1.2$     Condition (4)

$-0.6 < f_{1N}/f < -0.3$     Condition (5)

where f is the focal length of the entire lens when focused on an object at infinity, $f_1$ is the focal length of the first lens group, $f_2$ is the focal length of the second lens group, $f_3$ is the focal length of the third lens group, $f_{1I}$ is the focal length of the most object-side lens element in the first lens group, and $f_{1N}$ is the focal length of the negative lens element in the first lens group.

30. An inner-focus type lens comprising, in sequential order from the object side:

a first lens group having a positive refractive power and formed of, in sequential order from the object side, one or two positive lens element(s), a negative lens element, and a positive lens element;

a second lens group having a negative refractive power and formed of, in sequential order from the object side, a negative lens element and a positive lens element;

a third lens group having a positive refractive power and formed of, in sequential order from the object side
  a biconvex lens element,
  a lens element of negative refractive power having a meniscus shape with its convex surface on the image side, and
  a lens element of positive refractive power having a meniscus shape with its convex surface on the image side; and wherein focusing is performed by moving the second lens group as one unit along the optical axis, and the following Conditions (1)–(3) are satisfied $0.58 < f_1/f < 0.84$     Condition (1)

$-0.58 < f_2/f < -0.4$     Condition (2)

$0.54 < f_3/f < 1.2$     Condition (3)

where f is the focal length of the entire lens when focused on an object at infinity, $f_1$ is the focal length of the first lens group, $f_2$ is the focal length of the second lens group, and $f_3$ is the focal length of the third lens group.

31. An inner-focus type lens comprising, in sequential order from the object side:

a first lens group having a positive refractive power and formed of, in sequential order from the object side, one or two positive lens element(s), a negative lens element, and a positive lens element;

a second lens group having a negative refractive power and formed of, in sequential order from the object side, a negative lens element and a positive lens element;

a third lens group having a positive refractive power and formed of, in sequential order from the object side
  a biconvex lens element,
  a lens element of negative refractive power having a meniscus shape with its convex surface on the image side, and
  a lens element of positive refractive power having a meniscus shape with its convex surface on the image side; and wherein focusing is performed by moving the second lens group as one unit along the optical axis, and the following Conditions (1)–(5) are satisfied $0.58 < f_1/f < 0.84$     Condition (1)

$-0.58 < f_2/f < -0.4$     Condition (2)

$0.54 < f_3/f < 1.2$     Condition (3)

$0.5 < f_{1I}/f < 1.2$     Condition (4)

$-0.6 < f_{1N}/f < -0.3$     Condition (5)

where f is the focal length of the entire lens when focused on an object at infinity, $f_1$ is the focal length of the first lens group, $f_2$ is the focal length of the second lens group, $f_3$ is the focal length of the third lens group, $f_{1I}$ is the focal length of the most object-side lens element in the first lens group, and $f_{1N}$ is the focal length of the negative lens element in the first lens group.

\* \* \* \* \*

UNITED STATES PATENT AND TRADEMARK OFFICE
CERTIFICATE OF CORRECTION

| | |
|---|---|
| PATENT NO. | : 6,600,609 B2 |
| DATED | : July 29, 2003 |
| INVENTOR(S) | : Yamakawa |

It is certified that error appears in the above-identified patent and that said Letters Patent is hereby corrected as shown below:

<u>Title page,</u>
Item [73], Assignee, change to -- Fuji Photo Optical Co., Ltd., Saitama (JP) --;

<u>Column 4,</u>
Line 48, change "Brogne" to -- Brownie --;
Line 60, change "too excessive" to -- excessive --; and <u>Column 14,</u>
Line 57, change "Rather the" to -- Rather, the --.

Signed and Sealed this

Seventeenth Day of February, 2004

JON W. DUDAS
*Acting Director of the United States Patent and Trademark Office*